(12) United States Patent
Into

(10) Patent No.: US 6,734,992 B1
(45) Date of Patent: May 11, 2004

(54) IMAGE PROCESSING APPARATUS, IMAGE PROCESSING METHOD AND MEMORY MEDIUM

(75) Inventor: Junichi Into, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/469,240

(22) Filed: Dec. 22, 1999

(30) Foreign Application Priority Data

Dec. 28, 1998 (JP) ............................. 10-374397

(51) Int. Cl.$^7$ ........................... G06K 15/00; G06K 9/18
(52) U.S. Cl. ..................... 358/3.28; 382/185; 358/453
(58) Field of Search ................................ 358/3.28, 505, 358/520, 530, 453, 448, 464; 382/180, 190, 125, 176, 185

(56) References Cited

U.S. PATENT DOCUMENTS 5,579,120 A * 11/1996 Oguro .......................... 386/94

FOREIGN PATENT DOCUMENTS

| JP | 404169257 A | * 6/1992 | ............... B41J/5/30 |
| JP | 07074943 | * 3/1995 | ............ H04N/1/40 |
| JP | 407210421 A | * 8/1995 | ........... G06F/11/28 |
| JP | 411196259 | * 7/1999 | .......... H04N/1/387 |
| JP | 2000-287066 | * 10/2000 | .......... H04N/1/387 |

* cited by examiner

Primary Examiner—Jerome Grant, II
(74) Attorney, Agent, or Firm—Fitzpatrick, Cella, Harper & Scinto

(57) ABSTRACT

The invention intends to construct an image processing environment in which the copyright protecting information can be easily added to the print information without disturbing the print image and there can be easily discriminated whether the print information contains the copyright information. In an image processing apparats capable of executing a printing process on a recording medium by a printing unit, based on video information generated from print information entered from an information processing apparatus through a predetermined communication medium, the isolated point extracting circuit detects a predetermined isolated point in the video information and a copyright discriminating circuit discriminates whether the print information entered from the information processing apparatus contains copyright information based on the result of detection by the isolated point extracting circuit.

28 Claims, 9 Drawing Sheets

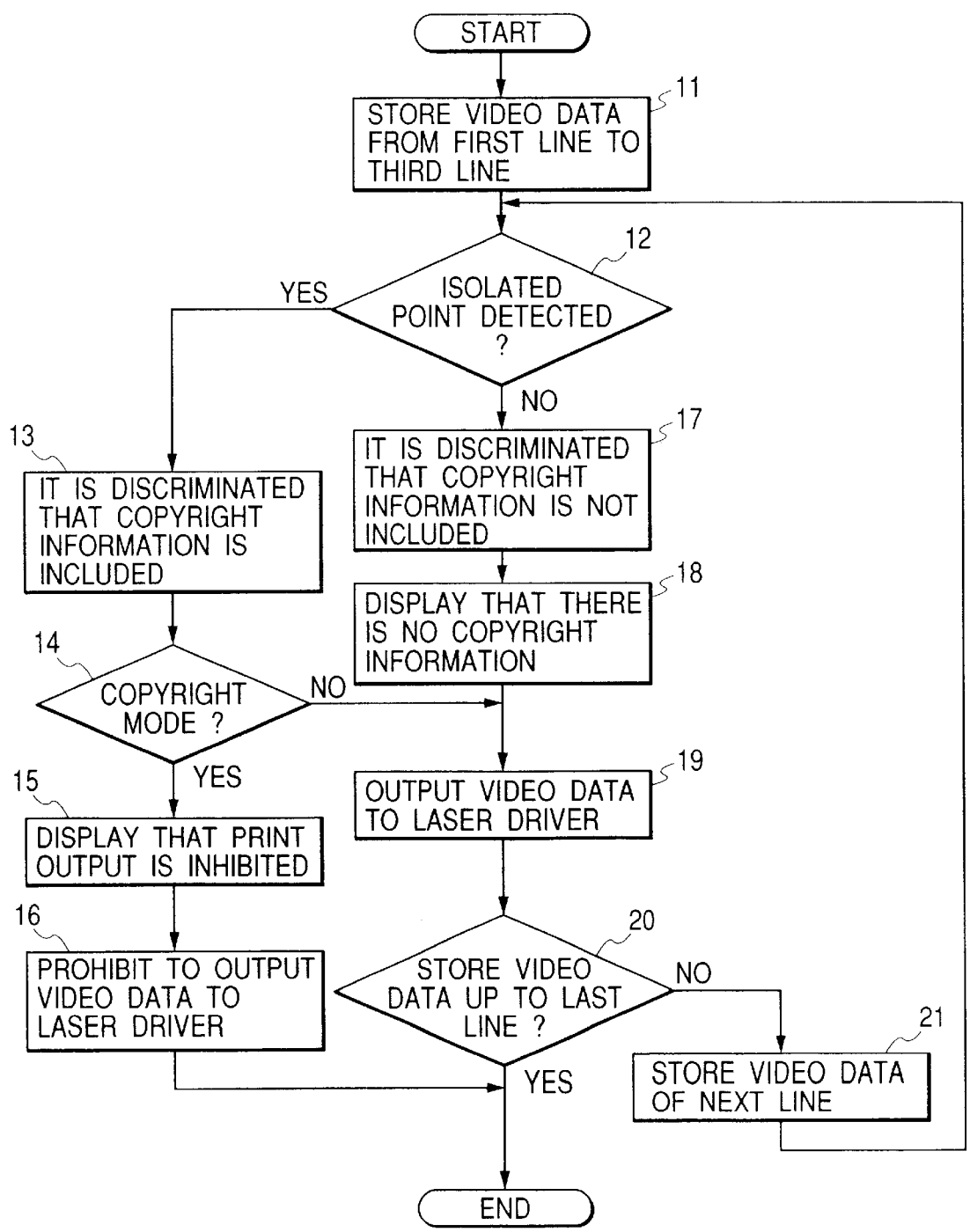

IMAGE PROCESSING APPARATUS, IMAGE PROCESSING METHOD AND MEMORY MEDIUM

BACKGROUND OF THE INVENTION

1. Field of the Invention

The present invention relates to an image processing apparatus, an image processing method and a memory medium.

2. Related Background Art

Conventionally, digitized work has no means for preventing the illegal copy thereof, and there has not been established the means for protecting the copyright thereof. For example, in a conventional output apparatus designed to receive digital information from a host computer and to execute an image output, the ordinary digital print information can be printed without any protection, so that, even if the digital information has a copyright, it has not been possible to avoid the illegal copying of such work.

In recent years, the protection of the copyright of the digital information has become important from the standpoint of the protection of the personal right, and there is being required means capable of securely protecting the copyright with a low cost.

Firstly there is required new means for inhibiting the printing of data to which the copyright information is attached, and there is also required means for discriminating whether the copyright information is attached or not. It has also become important that the print information is not perturbed by the copyright information, but there has not been a secure method of copyright protection meeting these requirements with a low cost.

SUMMARY OF THE INVENTION

An object of the present invention is to resolve the above-mentioned drawbacks.

Another object of the present invention is to execute adequate printing control for the image containing copyright information.

Still another object of the present invention is to print, in an image containing copyright information, only a part not containing the copyright.

Still another object of the present invention is to provide novel functions.

Still other objects of the present invention, and the features thereof, will become fully apparent from the following description of the embodiment, to be taken in conjunction with the attached drawings.

BRIEF DESCRIPTION OF THE DRAWINGS

FIG. 9 is a flow chart showing a second control sequence of the output device of the present invention;

DETAILED DESCRIPTION OF THE PREFERRED EMBODIMENTS

First Embodiment

Prior to the description of the configuration of the present embodiment, there will be explained, with reference to FIG. 1, the configuration of a laser beam printer adapted to apply the present embodiment. However, the present embodiment can be applied not only to a laser beam printer but also to the printers of other systems such as an ink jet printer.

Figure 1:
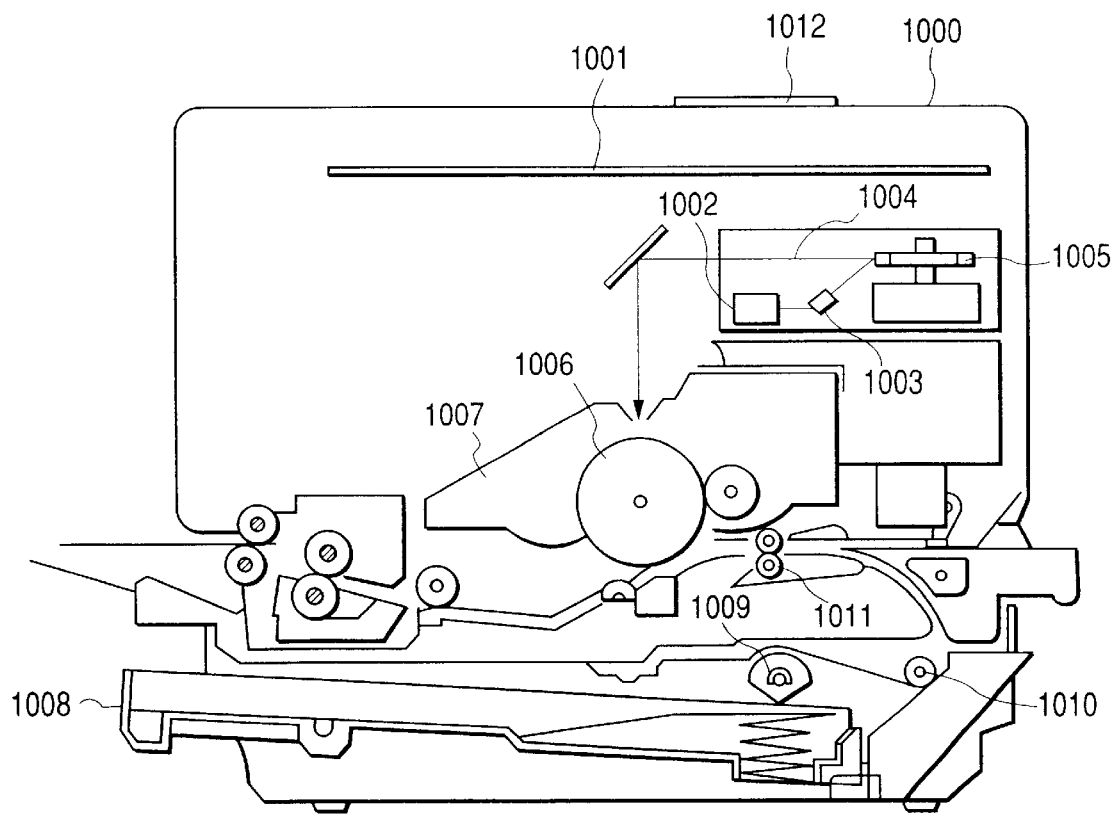
FIG. 1 is a cross-sectional view showing the configuration of a laser beam printer, in which an output device constituting a first embodiment of the present invention is applicable.

FIG. 1 is a cross-sectional view showing the configuration of a laser beam printer in which the output device constituting the first embodiment of the present invention is applicable.

Referring to FIG. 1, a main body 1000 of the LBP enters print information (character codes in a page description language), form information and a macro instruction supplied from a host computer externally connected through an unrepresented interface (I/F), and forms an image on a recording sheet by generating a character pattern or a form pattern according to such information. An operation panel 1012 is provided with operation switches, keys for various settings (a key input unit 603 shown in FIG. 7) and a display unit such as an LED display unit or a LCD (display unit 602 shown in FIG. 7).

A control unit 1001 controls the entire LBP main body 1000 and analyzes the character information, graphic information, image information etc. supplied from the host computer. The control unit 1001 principally executes conversion of the analyzed character information into a video signal of the corresponding character pattern, for supply to a laser driver 1002. The printer control unit 1001 is further provided with a copyright protection circuit, to be explained later, shown in FIG. 2, for limiting the output of the video signal to the laser driver 1002.

A laser driver 1002 for driving a semiconductor laser 1003 turns on and off a laser beam 1004 emitted from the semiconductor laser 1003, according to the input video signal. The laser beam 1004 is laterally deflected by a rotary polygon mirror 1005 to scan an electrostatic drum 1006, thereby forming an electrostatic latent image of the character pattern thereon. The latent image is developed by a developing unit 1007 provided around the electrostatic drum 1006, and the developed image is transferred onto the recording paper.

The recording paper is composed of a cut sheet. The cut recording sheet is contained in a sheet cassette 1008 mounted on the LBP main body 1000, and is supplied therefrom by a feed roller 1009 and conveying rollers 1010, 1011 to the electrostatic drum 1006. The LBP main body

1000 is provided with at least an unrepresented card slot for connecting an optional card (or emulation card) in addition to the internal fonts.

Figure 2:
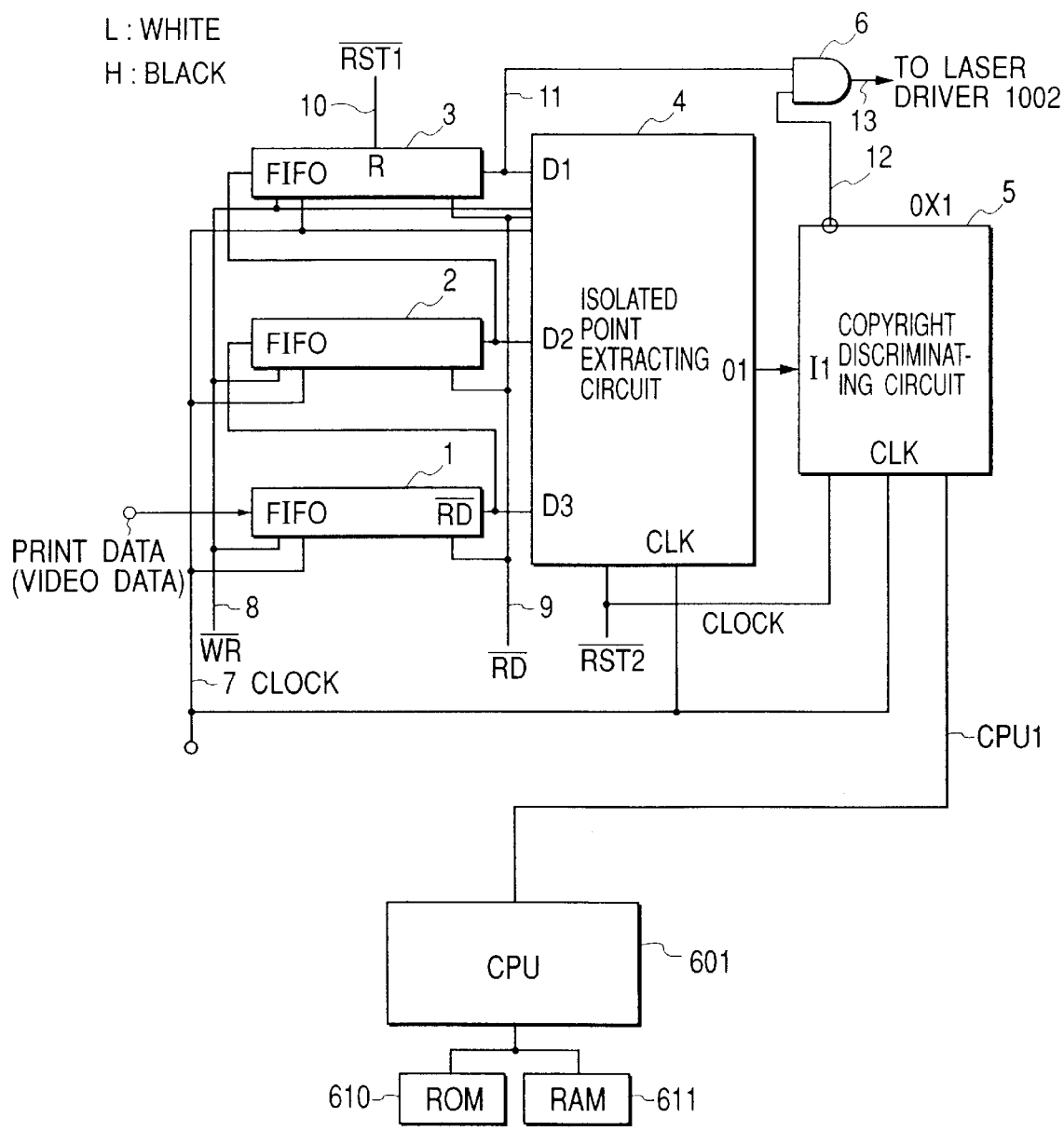
FIG. 2 is a circuit diagram showing the configuration of a copyright protection circuit attached to a printer control unit shown in FIG. 1.

FIG. 2 is a circuit diagram showing the configuration of the copyright protection circuit attached to the printer control unit 1001 shown in FIG. 1. In the following description will be given only on such attached portion, since other parts of the printer control unit 1001 are already known.

In FIG. 2 there are shown first-in-first-out memories (hereinafter represented as FIFO) 1 to 3 for temporarily storing the image information; an isolated point extracting circuit 4 for extracting an isolated white point, consisting of a central white point surrounded by black; a copyright discriminating circuit 5 for discriminating the presence or absence of copyright of the output information (whether the print data contain copyright information), based on the result of isolated point extraction by the isolated point extracting circuit 4; and a 2-input AND gate 6 (hereinafter represented as AND gate) for receiving the output of the FIFO 3 and that of the copyright discriminating circuit through signal lines 11, 12.

The signal input terminal of the FIFO 1 is connected to a video signal output line of the printer, and the signal output terminal thereof is connected to the signal input terminal of the FIFO 2 and the data input terminal D3 of the isolated point extracting circuit 4. The signal output terminal of the FIFO 2 is connected to the signal input terminal of the FIFO 3 and the data input terminal D2 of the isolated point extracting circuit 4. The signal output terminal of the FIFO 3 is connected to the data input terminal D1 of the isolated point extracting circuit 4 and an input terminal of the AND gate 6.

The signal output terminal O1 of the isolated point extracting circuit 4 is connected to the signal input terminal I1 of the copyright discriminating circuit 5, and the output terminal OX1 thereof is connected to the other input terminal of the AND gate 6 through a signal line 12, for sending an output signal indicating the result of discrimination whether the print data are copyright information. The output terminal of the AND gate 6 outputs a video signal for modulating the laser of the printer to the laser driver 1002 shown in FIG. 1, through a signal line 13.

Among signal lines 7 to 10, a signal line 7 enters a clock signal to the clock signal input terminals of the FIFO's 1 to 3, isolated point extracting circuit 4 and copyright discriminating circuit 5. A signal line 8 enters a WR bar signal to the WR bar signal input terminals of the FIFO's 1 to 3. A signal line 9 enters a RD bar signal to the RD bar signal input terminals of the FIFO's 1 to 3. A signal line 10 enters a reset signal RST1 bar to the RAM reset terminal of the FIFO 3.

Also the reset signal input terminal of the isolated point extracting circuit 4 receives a reset signal RST2 bar, which is different from the reset signal RST1 bar. Also the copyright discriminating circuit 5 is provided, as reset signal input terminals, a CPU1 signal input terminal and a RST2 bar signal input terminal, which respectively receive a CPU1 signal and a RST2 bar signal from the CPU 601.

The CPU 601 collectively controls the printer control unit 1001 based on a program stored in the ROM 610. A RAM 611 is used as the work area of the CPU 601.

In the following there will be explained the functions of various units of the copyright discriminating circuit 5 with reference to a timing chart shown in FIG. 3.

Figure 3:
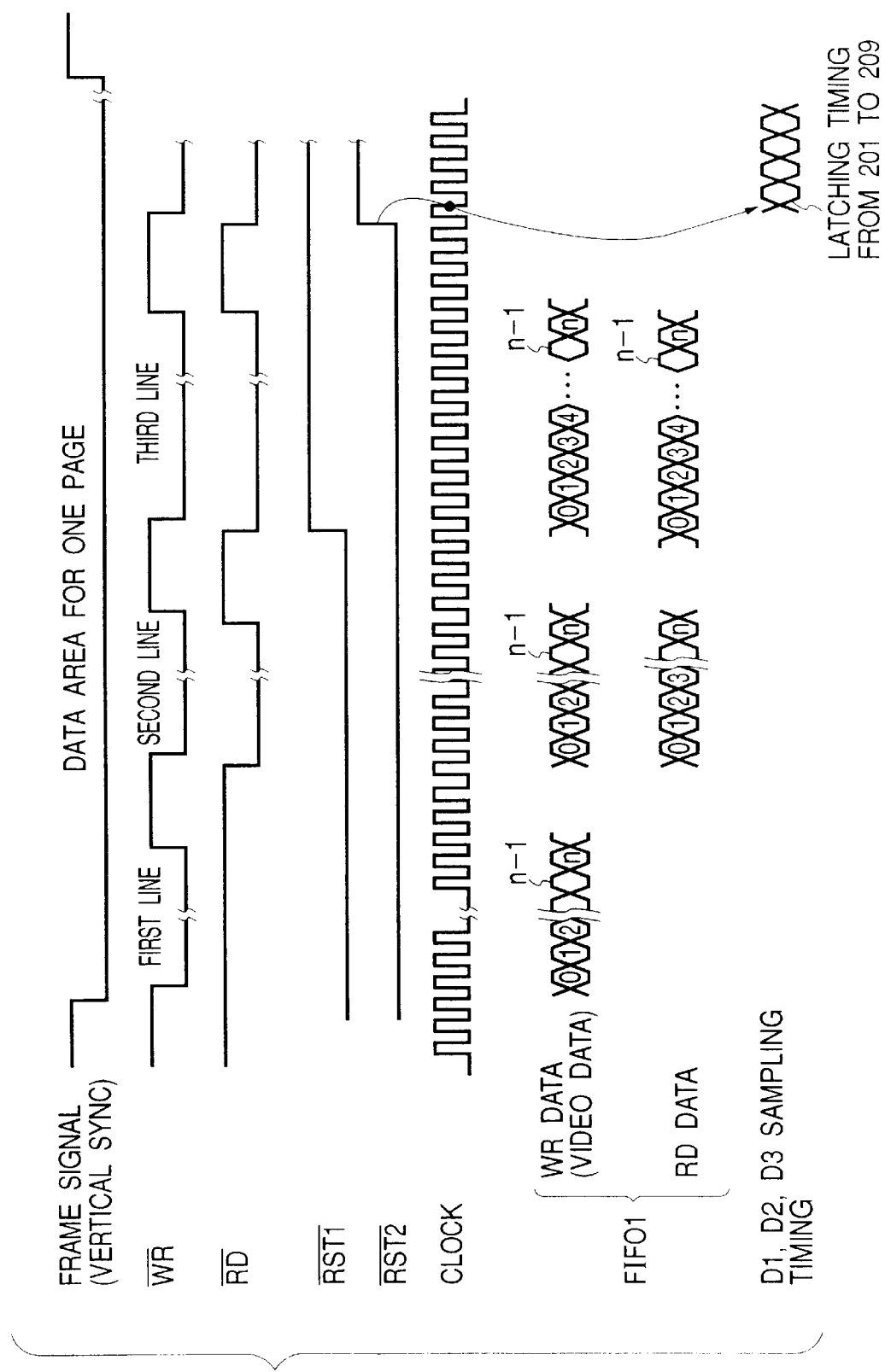
FIG. 3 is a timing chart showing the timing of generation of various signals in the output device of the present invention.

FIG. 3 is a timing chart showing the timing of generation of various signals in the output device of the present invention.

The printer is usually controlled, based on a main scanning data effective signal indicating the data area of a page and a sub scanning data effective signal indicating the data area of each line, and the signals shown in FIG. 3 are generated, based on these signals.

Referring to FIG. 3, a frame signal (vertical synchronization signal) corresponds to the main scanning data effective signal, and a WR bar signal corresponding to the sub scanning data effective signal (effective at the L-level).

The WR bar signal becomes active when the frame signal is at the L-level, and, when the WR bar signal is at the L-level, the image signal of each scanning line is outputted to the video signal output line in synchronization with the upshift of the clock signal. The RD bar signal is switched in synchronization with the downshift of the clock signal, and changes earlier than the WR bar signal by a half cycle of the clock signal.

However, the RD bar signal is not rendered active when the WR bar signal of the first line is at the L-level. The RST1 bar signal and the RST2 bar signal are set at the L-level when the frame signal is at the H-level, and the RST1 bar signal is shifted to the H-level, when the frame signal is at the L-level, at the second downshift edge of the RD bar signal, thereby activating the write-in and read-out operations of the FIFO 3.

Similarly the RST2 bar signal is shifted to the H-level, when the frame signal is at the L-level, at the third downshift edge of the RD bar signal, thereby activating the copyright discriminating circuit 5.

A control signal CPU1 is supplied by the CPU 601 which controls the printer. In the following there is considered a situation where the CPU1 signal is at the L-level.

When various signals shown in FIG. 3 are given to the copyright discriminating circuit, the image information of the first line is accumulated in the FIFO 1 when the WR bar signal assumes the first L-level state. Then, when the RD bar signal, corresponding to the next L-level state of the WR bar signal, assumes the L-level state for the first time after the frame signal assumes the L-level state, the video data accumulated in the FIFO 1 are accumulated in the FIFO 2 in succession in synchronization with the clock signals, and at the same time the data of the second line are accumulated in the FIFO 1.

Similarly the RST1 bar signal assumes the H-level when the RD bar signal assumes the L-level state next time, and the video data accumulated in the FIFO 2 are read in the L-level state of the RD bar signal and are accumulated in the FIFO 3 in succession in synchronization with the clock signals. At the same time the video data accumulated in the FIFO 1 are accumulated in the FIFO 2 and the data of the third line are written and accumulated in the FIFO 1 (at the L-level state of the WR bar signal).

Then, at the next downshift of the RD bar signal, the RST2 bar signal assumes the H-level to activate the isolated point extracting circuit 4. Thereafter (at the third line and thereafter), the RST1 bar signal and the RST2 bar signal are in the H-level state until the frame signal assumes the H-level, whereby the FIFO 1, FIFO 2 and FIFO 3 respectively store the print data of n-th, (n-1)th and (n-2)th lines, and the input terminals D1, D2, D3 simultaneously read the print data of three lines at each clock signal, in synchronization with the upshift edge thereof, when the RD bar signal is at the L-level state.

These data are stored in succession in a 3×3 matrix register circuit (shown in FIG. 4) in the isolated point extracting circuit 4, and there is discriminated the data at the center and the surrounding data.

Figure 4:
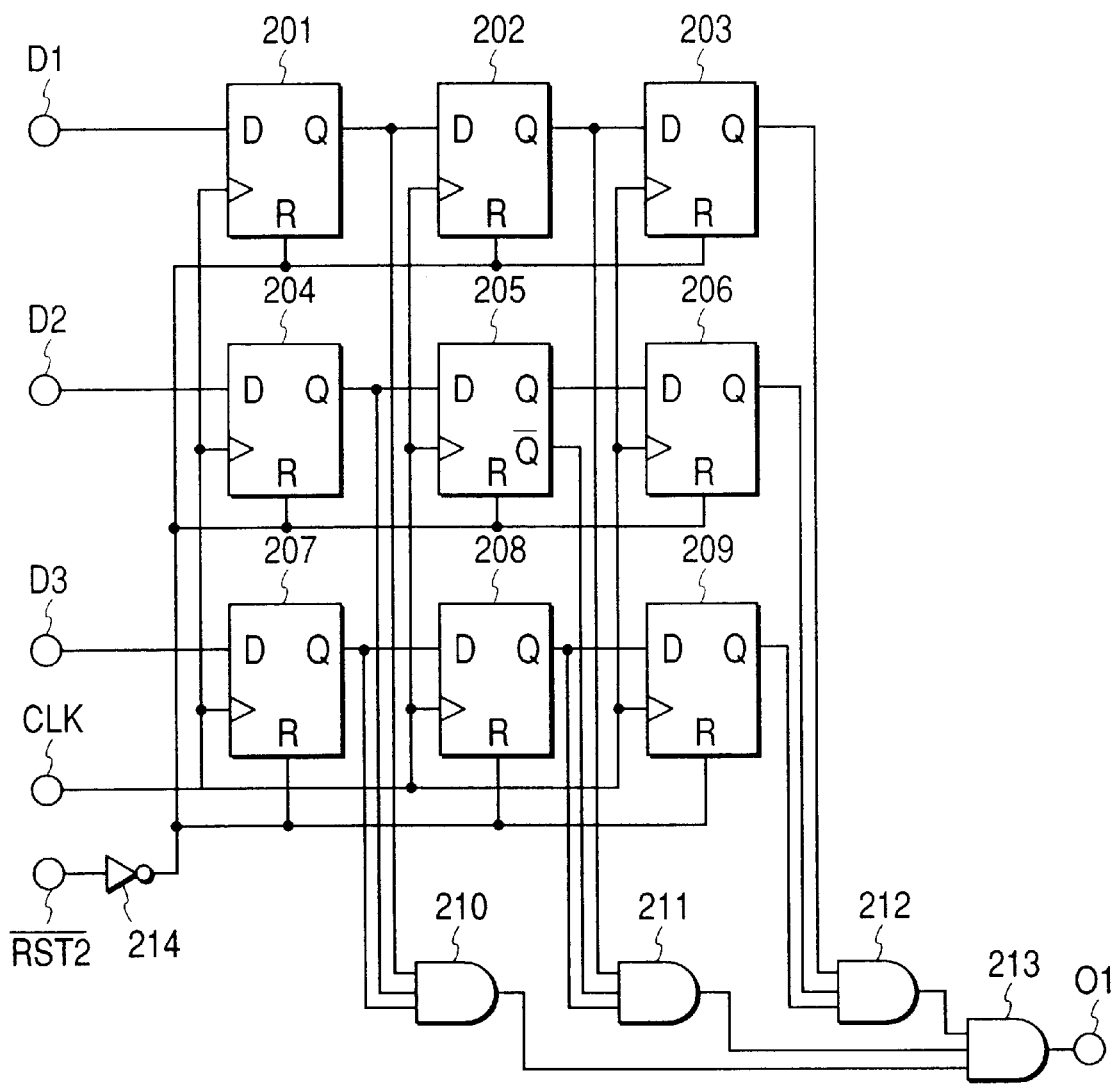
FIG. 4 is a circuit diagram showing the configuration of an isolated point extracting circuit shown in FIG. 2.

FIG. 4 shows the details of the isolated point extracting circuit 4, including a gate circuit for detecting a white isolated point when the center point alone is at the L-level and all the surrounding information are at the H-level.

FIG. 4 is a circuit diagram showing the configuration of the isolated point extracting circuit 4 shown in FIG. 2.

As shown in FIG. 4, the isolated point extracting circuit 4 is composed of D-flip-flops (DFF's) 201 to 209 constituting the above-mentioned 3×3 matrix register circuit, 3-input AND gates (hereinafter simply called AND gates) 210 to 213, and an inverter 214.

The CLK input terminals of the DFF's 201 to 209 are connected to a terminal CLK, and the reset terminals R thereof are connected to the output terminal of the inverter 214. The D input terminal of the DFF 201 is connected to a D1 terminal, and the Q output terminal is connected to an input terminal of the AND gate 210 and the D input terminal of the DFF 202. The Q output terminal of the DFF 202 is connected to an input terminal of the AND gate 211 and the D input terminal of the DFF 203. The Q output terminal of the DFF 203 is connected to an input terminal of the AND gate 212.

Similarly the D input terminal of the DFF 204 is connected to a D2 terminal, and the Q output terminal is connected to an input terminal of the AND gate 210 and the D input terminal of the DFF 205. The Q bar output terminal of the DFF 205 is connected to an input terminal of the AND gate 211, and the Q output terminal thereof is connected to the D input terminal of the DFF 206. The Q output terminal of the DFF 206 is connected to an input terminal of the AND gate 212.

Similarly the D input terminal of the DFF 207 is connected to a D3 terminal, and the Q output terminal is connected to an input terminal of the AND gate 210 and the D input terminal of the DFF 208. The Q output terminal of the DFF 208 is connected to an input terminal of the AND gate 211 and the D input terminal of the DFF 209.

The Q output terminal of the DFF 209 is connected an input terminal of the AND gate 212. The output terminals of the 3-input AND gates 210 to 212 are respectively connected to the three input terminals of the 3-input AND gate 213, which is connected to an output terminal O1.

Also the input terminal of the inverter 214 is connected to a RST2 bar terminal, for receiving the RST2 bar signal.

In the following there will be explained the functions of various units.

At first, when the RST2 bar signal is in the L-level state, the DFF's 201 to 209 are reset, whereby the circuit does not function and the signal O1 remains in the L-level.

Then, when the RST2 bar signal is shifted to the H-level state, the DFF's 201 to 209 are enabled, whereupon, at each upshift of the clock signal entered at the CLK terminal, the DFF's 201, 204, 207 respectively latch the signals at the terminals D1, D2, D3 while DFF's 202, 205, 208 respectively latch the data latched in the DFF's 201, 204, 207 and the DFF's 203, 206, 209 respectively latch the data latched in the DFF's 202, 205, 208.

Then the Q outputs of the DFF's 201 to 204, 206 to 209 and the Q bar output of the DFF 205 are processed in the AND gates 210 to 213 whereby the signal from the output terminal O1 assumes the H-level state only when a white isolated point is entered into the DFF 205.

Thus, the white isolated point can be detected by comparing the 3×3 matrix signals in the consecutive three rows of the image information with a reference pattern.

When an isolated point detection signal is released from the output terminal O1, an H-level signal is entered into the input terminal of the copyright discriminating circuit 5 and is set in an internal register at the downshift of the CLK signal, thereby outputting an L-level signal at the output terminal OX1 of the copyright discriminating circuit 5 to turn off the AND gate 6, whereby the laser modulating video signal is no longer supplied through the signal line 13 to the laser driver 1002 shown in FIG. 1.

In the following there will be explained the details of the copyright discriminating circuit 5 with reference to FIG. 5.

Figure 5:
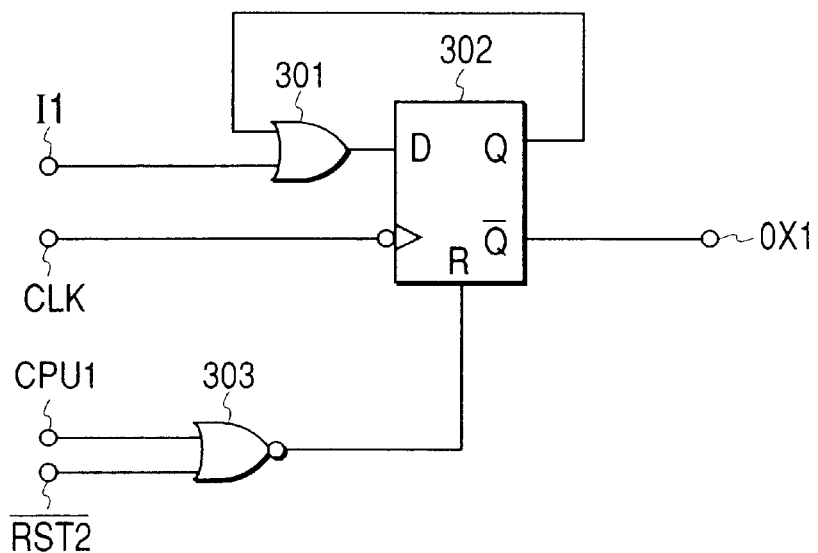
FIG. 5 is a circuit diagram showing the configuration of a copyright discriminating circuit shown in FIG. 2.

FIG. 5 is a circuit diagram showing the configuration of the copyright discriminating circuit 5.

The copyright discriminating circuit 5 is composed of a 2-input OR gate 301, a D-flip-flop (DFF) 302, and a 2-input NOR gate 303.

A terminal 11 is connected to an input terminal of the OR gate 301, of which output is connected to the D input terminal of the DFF 302. The Q output terminal 302 thereof is connected to the other input terminal of the OR gate 301, and the Q bar output terminal of the DFF 302 is connected to an output terminal OX1.

Also the reset terminal R of the DFF 302 is connected to the output terminal of the NOR gate 303, while an input terminal thereof is connected to a CPU1 signal terminal and the other input terminal is connected to a RST2 bar signal terminal.

As the present circuit is designed to receive an L-level signal at the CPU1 signal terminal, in the following there will be explained the functions in such state.

When the frame signal assumes the H-level state, the RST2 bar signal is shifted to the L-level whereby the reset terminal R of the DFF 202 receives an H-level signal to fix the output terminal OX1 at the H-level. As a result, the AND gate 6 shown in FIG. 2 is turned on whereby the video signal on the signal line 11 can be directly outputted through the signal line 13 to the laser driver 1002 shown in FIG. 1.

Then, with the start of the printing operation, the frame signal is shifted to the L-level state while the RST2 bar signal is shifted to the H-level, the reset terminal R of the DFF 302 is shifted to the 16 L-level state whereby the signal at the input terminal 11 is latched at the Q terminal at each downshift of the clock signal supplied to the CLK terminal. Then, when the terminal II is shifted to the H-level state and is latched at the Q terminal of the DFF 302, the output thereof is fed back to the other input terminal of the OR gate 301 thereby maintaining the Q output.

In this state the Q bar output of the DFF 302 assumes the L-level state whereby an input terminal of the 2-input AND gate 6 assumes the L-level state to inhibit the output of the signal of the line 11 to the signal line 13, so that the signal output to the laser driver 1002 shown in FIG. 1 is inhibited.

When the output OX1 is once shifted to the L-level state under such condition, the frame signal is once shifted to the H-level and then the RST2 bar signal is shifted to the H-level to retain this state until the latched state of the FDD 302 is cleared. Thus, after the detection of the isolated point, the printing operation of the corresponding page is inhibited.

In this manner there can be prevented the printing of only the page containing the copyright information.

It is also possible to inhibit all the printing operation after the detection of the isolated point, by causing the CPU 601 of the printer controller to set the control signal of L-level in advance at the CPU1 terminal and to given a signal of H-level to the CPU1 terminal after the resetting of the DFF 302 (naturally under a condition that the RST2 bar signal is at the L-level and the frame signal is at the H-level).

It is thus rendered possible to securely prevent the printing of an image file containing the copyright information.

In the following there will be explained, with reference to FIG. 6, the copyright protecting process of the output device of the present invention.

Figure 6:
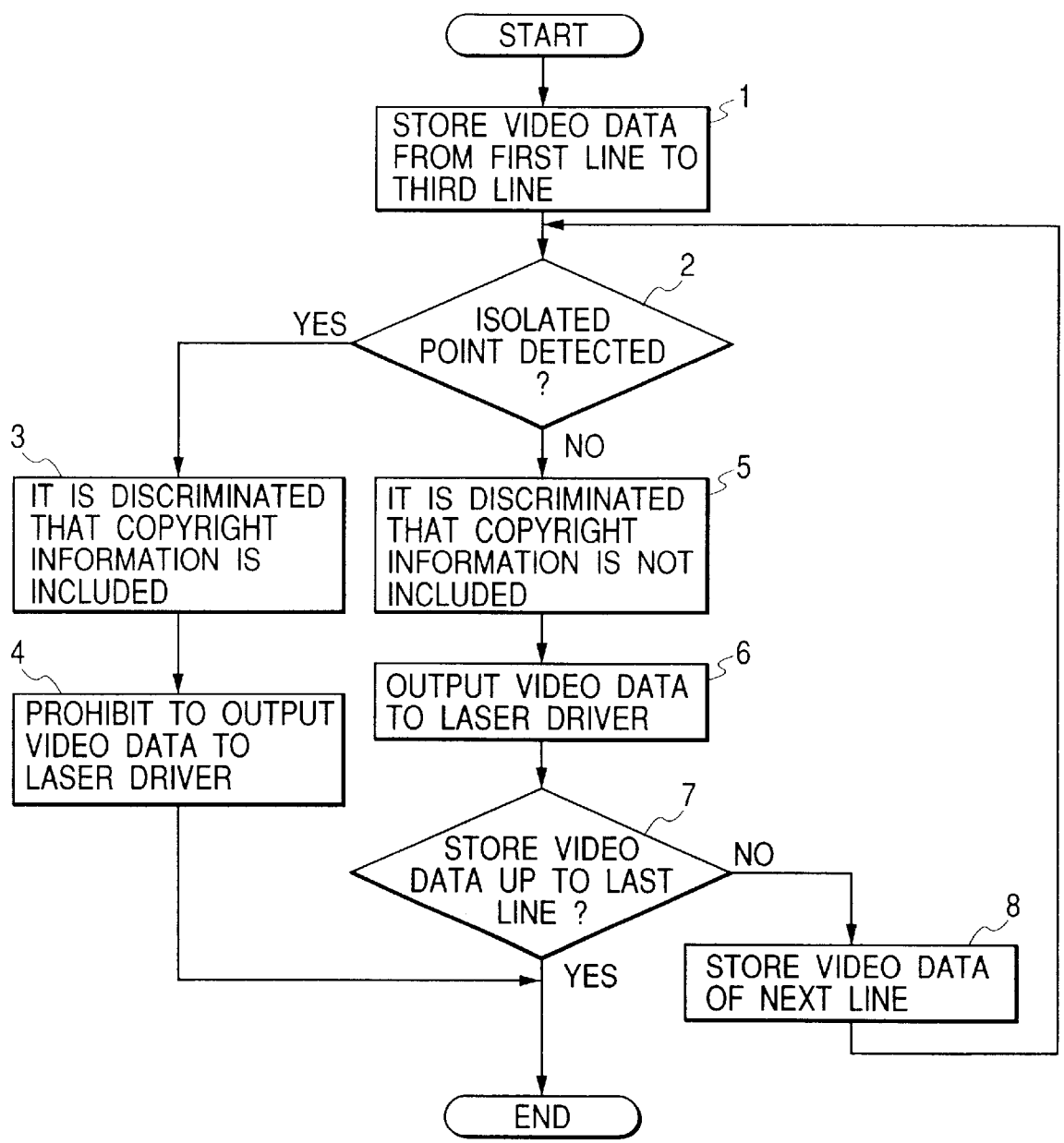
FIG. 6 is a flow chart showing a first control sequence of the output device of the present invention.

FIG. 6 is a flow chart showing a first control sequence of the output device of the present invention, corresponding to the copyright protecting process, wherein (1) to (8) indicate process steps.

At first the video data of the first line are stored in the FIFO 1. Then the data of the second line are stored in the FIFO 1 simultaneously with the accumulation of the video data, accumulated in the FIFO 1, into the FIFO 2 in succession in synchronization with the clock signals, and then the data of the third line are stored in the FIFO 1 simultaneously with the accumulation of the video data, accumulated in the FIFO 2, into the FIFO 3 and the accumulation of the video data, accumulated in the FIFO 1, into the FIFO 2. Thus there is reached a state where the FIFO 3 stores the data of the first line while the FIFO 2 stores the data of the second line and the FIFO 1 stores the data of the third line (1).

Then these data are stored in succession into the 3×3 matrix register circuit (DFF's 201 to 209) in the isolated point detecting circuit 4 for detecting the isolated point (2), and, upon detection of the isolated point, the video data are discriminated to contain the copyright information (3), whereupon the output of the video data from the FIFO 3 to the laser driver 1002 is inhibited (4), and the process is terminated.

On the other hand, if the step (2) does not detect the isolated point, the video data are discriminated not to contain the copyright information (5), whereupon the video data are outputted from the FIFO 3 to the laser driver 1002 (6). Then there is discriminated whether the video data have been accumulated to the last line in the FIFO 1 (7), and, if accumulated, the process is terminated.

On the other hand, if the step (7) identifies that the video data have not been accumulated to the last line in the FIFO 1, the data of the next line are accumulated in the FIFO 1 simultaneously with the accumulation of the video data, accumulated in the FIFO 2, into the FIFO 3 and the accumulation of the video data, accumulated in the FIFO 1, into the FIFO 2 (8) and the sequence returns to the step (2).

It is possible to limit the print output of the page containing the copyright information, by executing the above-described process for each page.

Second Embodiment

In the foregoing first embodiment, there has been explained a configuration of discriminating the copyright information based on the detection of the isolated point in the video signal and inhibiting the printing after the detection of the isolated point, but there may be provided, in addition, a configuration for outputting an instruction signal for display that the copyright information is present, thereby indicating that the printing is inhibited. Such embodiment will be explained in the following.

Figure 7:
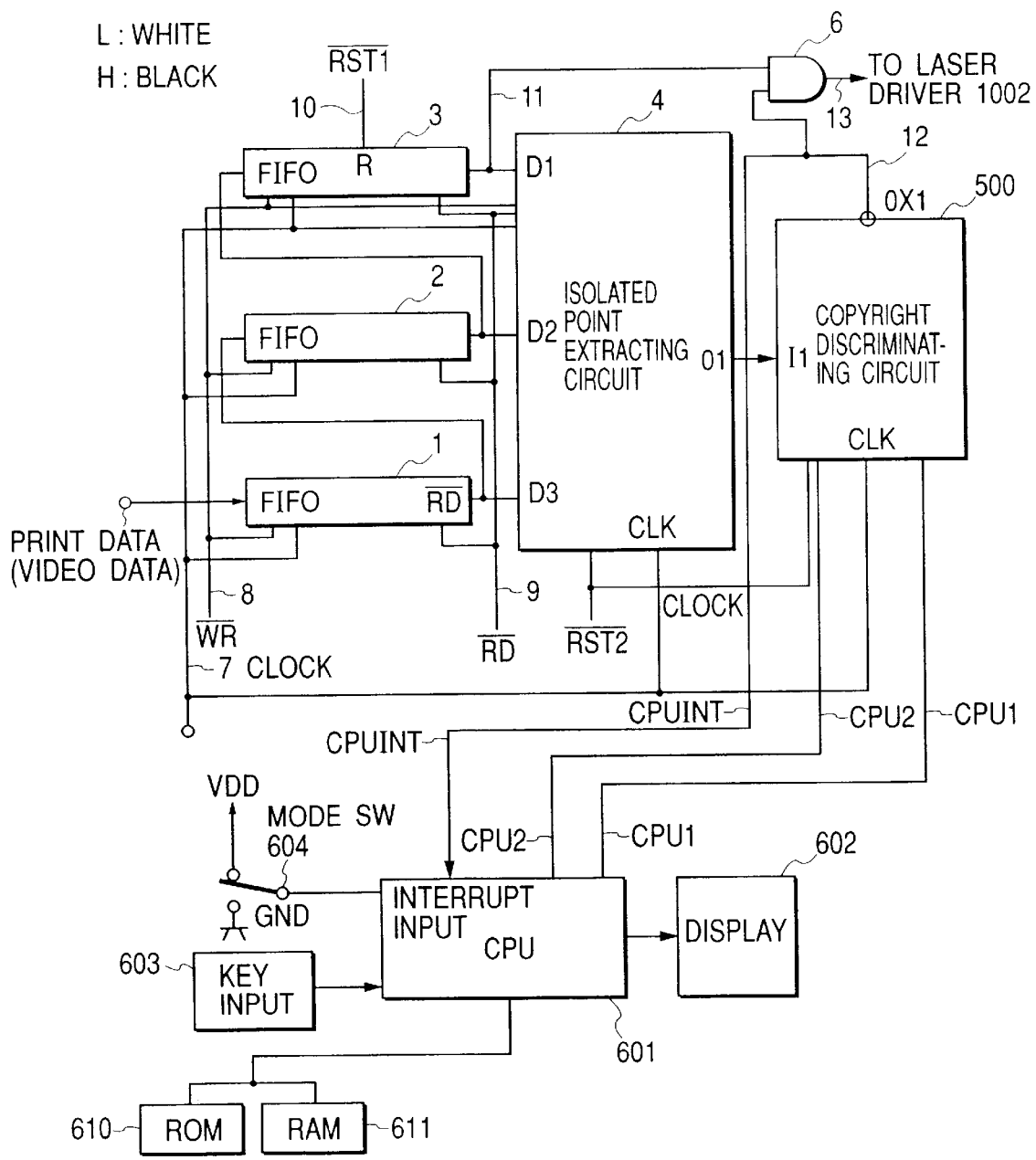
FIG. 7 is a block diagram showing the configuration of the copyright protecting circuit of an output device constituting a second embodiment of the present invention.

FIG. 7 is a block diagram showing the configuration of a copyright protection circuit of an output device constituting a second embodiment of the present invention, wherein components same as those in FIG. 2 are represented by same numbers.

Referring to FIG. 7, a copyright discriminating circuit 500 is formed by adding, to the copyright discriminating circuit 5 shown in FIG. 2, a CPUINT signal output terminal and a CPU2 signal input terminal, and is same in other operations. Therefore such same operations will not be explained, and there will only be explained the additional functions.

The CPUINT signal output terminal is connected to the OX1 terminal of the copyright discriminating circuit 500 and is connected to the CPU 601 for supplying an interruption signal thereto.

When the CPU interruption signal is generated from the CPUINT signal output terminal, the CPU 601 outputs an instruction signal for displaying that the copyright information is present, on a display unit 602 of the operation panel 1012 or on a display unit of an unrepresented host computer, thereby indicating that the copyright information is present and that the printing is inhibited.

Therefore the user can promptly understand that the image output is interrupted because the copyright information is contained, and there can be avoided the misunderstanding that the interruption of the image output is caused for example by a trouble in the image processing apparatus.

Also, in case the print start command is given to a file and the H-level signal is not outputted at the CPUINT terminal until the end of the printing operation, the CPU 601 executes a display that the copyright information is absent on the display unit 602 or the display unit of the unrepresented host computer.

Thus the user can easily recognize whether the print information contains the copyright information or not.

The CPU 601 is also provided, as an optional function, with a mode SW input terminal, which is connected with a mode SW 604 provided on the operation panel 1012. When the mode SW is positioned at the VDD side, an H-level signal is entered into the mode SW input terminal to shift the CPU2 signal to the H-level state thereby assuming the copyright mode, in which enabled are the function, upon identification of the copyright information by the detection of the white isolated point with the isolated point extracting circuit 4, of inhibiting the output of the copyright information, the function of displaying the inhibition of output and the function of displaying whether the copyright information is present or absent.

On the other hand, the mode SW is positioned at the GND side, an L-level signal is entered into the mode SW input terminal, whereby disabled are the function, upon identification of the copyright information by the copyright discriminating circuit 5 based on the detection of the white isolated point by the isolated point extracting circuit 4, of inhibiting the output of the video data to the laser driver 1012, the function of displaying the inhibition of output and the function of displaying whether the copyright information is present or absent.

The above-mentioned switch is set at the VDD side at the shipment from the manufacturer. However, the user having receiving a specified permission can shift the switch to the GND side to dispense with the copyright discriminating process.

Thus the user can be prevented from the printing operation without knowing that the data contain the copyright information, and, in case a permission is already obtained from the owner of the copyright, the user can shift the switch to output the data containing the copyright information.

Figure 8:
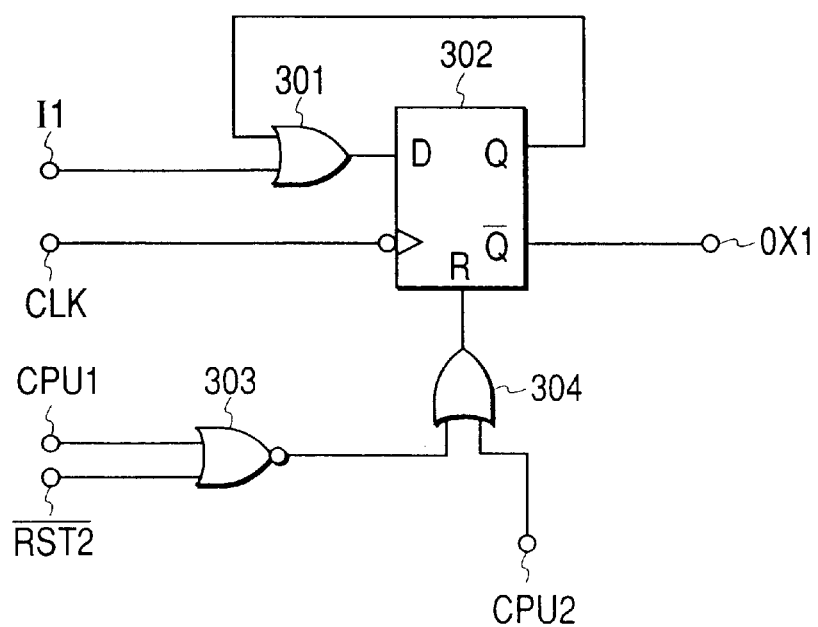
FIG. 8 is a circuit diagram showing the configuration of a copyright discriminating circuit shown in FIG. 7.

FIG. 8 is a circuit diagram showing the configuration of the copyright discriminating circuit 500 shown in FIG. 7, wherein components same as those in FIG. 5 are represented by same numbers.

An OR gate 304 receives the output signal of a NOR gate 303 and the CPU2 signal from the CPU 601. When the CPU2 signal is at the L-level state, the function of the copyright discriminating circuit 500 is same as that of the copyright discriminating circuit 5 shown in FIG. 5, but, when the CPU2 signal is at the H-level state, the DFF 302 is reset to fix the OX1 signal at the H-level state whereby the video signal for modulating the laser is not inhibited nor interrupted.

In this state, the display of the presence or absence of the copyright information is also inhibited in the CPU 601.

In the foregoing there has been explained a configuration of setting the copyright mode by the shifting of the unrepresented mode setting SW on the operation panel thereby disabling the function of inhibiting the output of the video data to the laser driver 1002 in case of identifying the copyright information, the function of displaying the inhibition of output and the function of displaying whether the copyright information is present or absent, but there may also be added a configuration in which print permission inquiry information such as an ID or a password is entered into the CPU 601 by the key input unit 603 of the operation panel 1012 or a keyboard of an unrepresented host computer, and the CPU 601 certifies the above-mentioned print permission inquiry information by making access to a predetermined server through an unrepresented interface and a network or a public communication channel, and, in case a print permission signal is received from the network or the like, shifts the CPU2 signal to the H-level state whereby the print output is not inhibited even in case the copyright discriminating circuit 5 discriminates the presence of the copyright information (namely disabling the function of inhibiting output of the video data to the laser driver 1002 in case the copyright discriminating circuit 5 identifies the presence of the copyright information).

In such case, the server information (for example address or telephone number) of the server to which access is made by the CPU 601 through the network or the public communication channel is contained in predetermined bits of the image information (for example several bits in the four corners of the image).

Thus the user, having received permission for the print output of the data containing the copyright information, can execute the print output of the data regardless whether the copyright information is present or not.

In the following there will be explained, with reference to FIG. 9, the copyright protecting process of an output device of the present invention.

FIG. 9 is a flow chart showing a second control sequence of the output device of the present invention, corresponding to the copyright protecting process, wherein (11) to (21) indicate process steps.

At first, the video data of a first line are stored in the FIFO 1. Then the data of a second line are stored in the FIFO 1, simultaneously with the accumulation of the video data, accumulated in the FIFO 1, in the FIFO 2 in succession in synchronization with the clock signals, and the data of a third line are stored in the FIFO 1, simultaneously with the accumulation of the video data, accumulated in the FIFO 1, in the FIFO 2 and the accumulation of the video data, accumulated in the FIFO 2, in the FIFO 3. Thus there is attained a state in which the FIFO 3 stores the data of the first line, the FIFO 2 stores the data of the second line and the FIFO 1 stores the data of the third line (11).

Then these data are stored in succession into the 3×3 matrix register circuit (DFF's 201 to 209) in the isolated point detecting circuit 4 for detecting the isolated point (12), and, upon detection of the isolated point, the video data are discriminated to contain the copyright information (13).

Then there is discriminated whether the copyright mode is assumed (14), and, if the copyright mode is discriminated, a display indicating the inhibition of the print output is given on the display 602 on the operation panel 1012 or on the display unit of an unrepresented host computer (15) and the output of the video data from the FIFO 3 to the laser driver 1002 is inhibited (16), and the process is terminated.

On the other hand, if the step (14) identifies that the copyright mode is not assumed, the sequence proceeds to a step (19).

On the other hand, if the step (12) does not detect the isolated point, the video data are discriminated not to contain the copyright information (17), whereupon a display indicating absence of the copyright information is given on the display 602 on the operation panel 1012 or on the display unit of the unrepresented host computer (18) and the video data are outputted from the FIFO 3 to the laser driver 1002 (19). Then there is discriminated whether the video data have been accumulated to the last line in the FIFO 1 (20), and, if accumulated, the process is terminated.

On the other hand, if the step (20) identifies that the video data have not been accumulated to the last line in the FIFO 1, the data of the next line are accumulated in the FIFO 1 simultaneously with the accumulation of the video data in the FIFO 2 into the FIFO 3 and the accumulation of the video data in the FIFO 1 into the FIFO 2 (21) and the sequence returns to the step (12).

It is thus rendered possible to limit the print output of the page containing the copyright information, and to print the data containing the copyright information only when the permission is obtained (copyright mode), by executing the above-described process for each page.

In the foregoing embodiments, there have been explained configurations is inhibiting the print output in case the copyright information is detected.

However, even within a print, the copyright may be present only in a photograph area or in a character area.

Also the user may wish to print an area where the copyright is absent.

Figure 11:
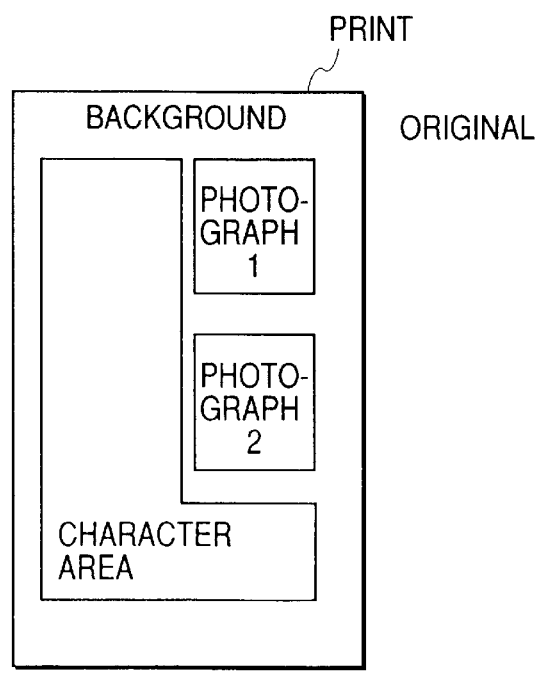
FIG. 11 is a view showing an example of the print original.

The present embodiment allows the user to identify the area where the copyright is absent, in case an area containing the copyright information and an area not containing the copyright information are mixedly present within a print original, composed for example, as shown in FIG. 11, of a character area, photograph areas 1, 2 and a background area.

Figure 10:
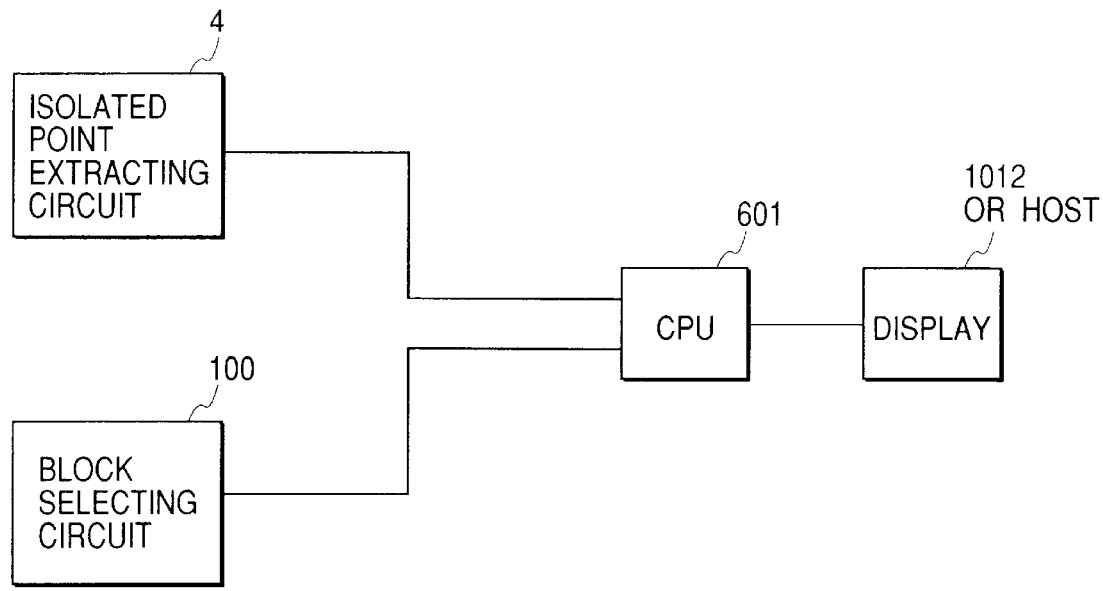
FIG. 10 is a block diagram of another embodiment.

FIG. 10 is a block diagram of the present embodiment.

The isolated point extracting circuit 4 provides the CPU 601 with an output indicating the position of the aforementioned white isolated point.

On the other hand, a block selection circuit 100 receives developed data, obtained by developing the print information supplied from the host computer and corresponding to the print original shown in FIG. 11, and the data of a frame (image frame) are binary digitized based on the averaged density of the data of the frame.

As a result, a high density portion such as the character area assumes the high level state in the binary digitization, while the photograph area in which the intermediate densities are present in continuous manner and the background area in which white is present continuously assume the low level state in the binary digitization. Then the block selection circuit 100 determines a boundary line surrounding the area of such high level state, and stores such area as an area 1 in a frame memory provided in the block selection circuit 100.

Then the average density is calculated again on the data other than the high level state area (namely in the photograph areas 1, 2 and the background area), and the photograph areas 1, 2 and the background area are binary digitized with such average density.

This time, the photograph area having the intermediate density assumes the high level state in the binary digitization, and the background area assumes the low level state in the binary digitization.

Then determined is a boundary line surrounding such high level state area, and the area within the boundary line is stored as an area 2 in the frame memory provided in the block selection circuit 100.

Subsequently the data on the remaining area (background area) are added and averaged again, then there is detected that the obtained averaged density is very low and such remaining background area is stored as an area 3 in the aforementioned frame memory.

The discrimination whether the average density is low is naturally executed in the calculation of the average value in the aforementioned detection of the character area and the photograph area.

Through the above-described process, the block selection circuit 100 executes the area division according to the attribute (character/photograph/background etc.) in the print original.

The CPU 601 refers to an area where the copyright information detected by the isolated point extracting circuit 4 is present continuously in excess of a predetermined number per unit area and the result of area division of the image determined by the block selection circuit 100, thereby discriminating the area in which the copyright information is present, and displays the result of discrimination in a manner enabling to identify the area where the copyright information is present, on the display unit of the operation panel 1012 or the unrepresented host computer.

By referring to the displayed result, the user can identify whether the area to be printed contains the copyright. If the area to be printed does not contain the copyright, the user can cut out such area by an editing operation on the operation panel 1012 or in the host computer and gives a print instruction, whereby there can be printed the area without the copyright, which is mixed with the print data involving the copyright information. Also in such editing operation, the area without the copyright can be printed in a large size, by giving an enlarging instruction for the area without the copyright.

The aforementioned display allowing to identify the area containing the copyright information can be realized by varying the display state in such area (for example elevating the density). The function of varying the display state can be realized, in case of display on the operation unit 1012, by a program of the ROM 610. On the other hand, in case of varying the display state on the display unit of the unrepresented host computer, a printer driver installed in the host computer receives a signal indicating the area from the CPU 601, and varies the display state.

In the foregoing description, the area division is achieved by repeating the binary digitization in the block selection circuit 100, but the identification of the character area, photograph area, background area etc. may also be identified by referring to the information indicating objects (character object, photograph object etc.) contained in the print information received from the host computer and the coordinate information in developing and printing such objects.

In the present embodiment, there has been explained a case where the output device of the present invention is applied to a laser beam printer (electrophotographic output apparatus), but the present invention may also be applied to output apparatus of ink jet system, sublimation system or other types. It may also be applied to a color printer instead of a monochromatic printer.

As explained in the foregoing, there can be constructed a simple and inexpensive image processing environment that can easily add the copyright protecting information to the print information without perturbing the same, and that allows to easily discriminate whether the print information contains the copyright information.

The objects of the present invention can also be attained in a case where a memory medium storing the program codes of a software realizing the functions of the aforementioned embodiments is supplied to a system or an apparatus and the functions of the aforementioned embodiments are realized by the computer (CPU or MPU) of the above-mentioned system or apparatus according to the program codes.

In such case the program codes themselves of the software realize the novel functions of the prevent invention, and the memory medium storing the program codes constitutes the present invention.

The memory medium storing such program codes can be, for example, a floppy disk, a hard disk, an optical disk, a magnetooptical disk, a CD-ROM, CD-R, a magnetic tape, a non-volatile memory card, a ROM or an EEPROM.

The present invention also includes not only a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments.

The present invention further includes a case wherein the program codes read from the memory medium are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

Also, the present invention may be applied to a system consisting of plural equipment or an apparatus consisting of a single equipment. Further, the present invention is naturally applicable to a case where the present invention is attained by supplying a system or an apparatus with a program. In such case, such system or apparatus can enjoy the effects of the present invention, by reading a program representing the software for attaining the present invention from a memory medium storing such program.

Furthermore, a system or an apparatus can enjoy the effects of the present invention by downloading a program representing the software for attaining the present invention from a data base on a network, through a communication program.

As explained in the foregoing, in an image processing apparatus capable of executing a printing process on a recording medium by a printing unit, based on video information generated from print information entered from an information processing apparatus through a predetermined communication medium, detection means detects a predetermined isolated point in the video information and discrimination means discriminates whether the print information entered from the information processing apparatus contains copyright information based on the result of detection by the detection means, whereby the copyright information can be easily discriminated by the copyright protecting information that can be easily added without disturbing the print image.

Also in an image processing apparatus capable of executing a printing process on a recording medium based on the print information entered from an information processing apparatus through a predetermined communication medium, discrimination means discriminates whether the print information contains copyright information or not and first control means informs the result of discrimination by the discrimination means, whereby the user can easily recognize whether the print information contains the copyright information.

Also in an image processing apparatus capable of executing a printing process on a recording medium based on the print information entered from an information processing apparatus through a predetermined communication medium, discrimination means discriminates whether the print information contains copyright information or not and first control means limits the printing process of the print information based on the result of discrimination by the discrimination means, whereby the printing process of the data containing the copyright information can be limited by the copyright protecting information that can be easily added without disturbing the print image.

Also in an image processing apparatus capable of executing a printing process on a recording medium based on the print information entered from an information processing apparatus through a predetermined communication medium, discrimination means discriminates whether the print information contains copyright information or not and, after a point where the discrimination means discriminates that the print information entered from the information processing apparatus contains the copyright information, first control means limits the printing process of the print information, whereby there can be prevented the printing of only the image file containing the copyright information.

Also in an image processing apparatus capable of executing a printing process on a recording medium based on the print information entered from an information processing apparatus through a predetermined communication medium, discrimination means discriminates whether the print information contains copyright information or not and, in a predetermined range after a point where the discrimination means discriminates that the print information entered from the information processing apparatus contains the copyright information, first control means limits the printing process of the print information, whereby there can be prevented the printing of only the page containing the copyright information.

Also in an image processing apparatus capable of executing a printing process on a recording medium based on the print information entered from an information processing apparatus through a predetermined communication medium, discrimination means discriminates whether the print information contains copyright information or not and, after a point where the discrimination means discriminates that the print information entered from the information processing apparatus contains the copyright information, first control means limits the printing process of the print information and informs that the printing is inhibited because the print information contains the copyright information, whereby the user can promptly recognize that the inhibition of the image output is due to the presence of the copyright information and there can be prevented misunderstanding that the interruption of the image output is due for example to a trouble in the image processing apparatus.

Also there is provided authorization means for authorizing the print permission, and, in case the print permission is authorized by the authorization means, the first control means does not inhibit the output of the video information to the printing unit even if the discrimination means discriminates that the print information contains the copyright information, whereby the use of the print information containing the copyright information can be authorized by a simple operation and such print information ca be printed.

Also there are provided input means for entering print permission inquiry information and communication means for communicating with a predetermined server through a predetermined communication medium, and the authorization means inquires the print permission to the predetermined server through the communication means and obtains authorization for the print permission, based on the print permission inquiry information entered by the input means, whereby the use of the print information containing the copyright information can be authorized by a simple operation and such print information can be printed.

Also there are provided setting means for copyright mode and second control means for enabling the result of discrimination by the discrimination means when the copyright mode is set by the setting means, whereby the user can be prevented from printing the data without knowing that the data contain the copyright information and can output the data containing the copyright information by turning off the copyright mode in case the permission is obtained from the owner of the copyright.

Also in a copyright protecting method for the image processing apparatus capable of executing a printing process on a recording medium by a printing unit, based on video information generated from print information entered from an information processing apparatus through a predetermined communication medium, steps are executed to detect a predetermined isolated point in the video information, to discriminate whether the print information entered from the information processing apparatus contains copyright information based on the result of detection, and to inhibit the output of the video information to the printing unit in case the print information entered from the information processing apparatus is discriminated to contain the copyright information, whereby the copyright information can be easily discriminated by the copyright protecting information that can be easily added without disturbing the print image.

Consequently there can be obtained various effects such as construction of the image processing environment in which the copyright protecting information can be easily added to the print information without disturbing the print image and there can be easily discriminated whether the print information contains the copyright information.

What is claimed is:

1. An image processing apparatus comprising:
   extraction means for extracting an isolated point in entered image information;
   discrimination means for discriminating copyright information according to an extraction by said extraction means;

process means for causing the display of a result of discrimination of said discrimination means; and control means for controlling printing of said image information when the copyright information is discriminated by said discrimination means.

2. An apparatus according to claim 1, wherein said control is to inhibit the printing.

3. An apparatus according to claim 1, wherein said control means inhibits the printing after the discrimination of said copyright information.

4. An image processing method comprising:

an extraction step of extracting an isolated point in the entered image information;

a discrimination step of discriminating copyright information according to an extraction by said extraction step;

a process step of causing the display of a result of discrimination of said discrimination step; and a control step of controlling the printing of said image information when the copyright information is discriminated by said discrimination step.

5. An image processing method according to claim 4, wherein said control is to inhibit the printing.

6. An image processing method according to claim 4, wherein said control step inhibits the printing after the discrimination of said copyright information.

7. A computer readable memory medium which stored a program, said program comprising the steps of:

an extraction step of extracting an isolated point in entered image information;

a discrimination step of discriminating copyright information according to an extraction in said extraction step; and a control step of controlling the printing of said image information when the copyright information is discriminated in said discrimination step.

8. A computer readable memory medium according to claim 7, wherein said control is to inhibit the printing.

9. A computer readable memory medium according to claim 7, wherein said program further comprises a process step of causing the display of a result of discrimination of said discrimination step.

10. A computer readable memory medium according to claim 7, wherein said control step inhibits the printing after the discrimination of said copyright information.

11. A computer readable memory medium according to claim 7, wherein said program further comprises:

a communication step of communicating with a predetermined server through a communication medium;

wherein said control step executes the printing when the printing is permitted by said communication, even if the copyright information is discriminated by said discrimination step.

12. A computer readable memory medium according to claim 7, wherein said program further comprises:

an area division step of executing division of the area of said image information; and an informing step of informing the area where the copyright information is present within said image information, based on the area information determined by said area division and a result of discrimination by said discrimination step.

13. A computer readable memory medium according to claim 12, wherein said informing is the display of the area where the copyright information is present, and said control step executes printing except for the area where said copyright information is present, according to an instruction of the operator.

14. A computer readable memory medium according to claim 12, wherein said area division is executed, based on binary digitization.

15. A computer readable memory medium according to claim 12, wherein said area division is executed by information indicating an object according to said image information.

16. A computer readable memory medium according to claim 12, wherein said image information is represented by a page description language.

17. An image processing apparatus comprising:

extraction means for extracting an isolated point in entered image information;

discrimination means for discriminating copyright information according to an extraction by said extraction means;

control means for controlling printing of said image information when the copyright information is discriminated by said discrimination means; and communication means for communicating with a predetermined server through a communication medium;

wherein said control means executes the printing when the printing is permitted by said communication, even if the copyright information is discriminated by said discrimination means.

18. An image processing apparatus comprising:

extraction means for extracting an isolated point in entered image information;

discrimination means for discriminating copyright information according to an extraction by said extraction means;

control means for controlling printing of said image information when the copyright information is discriminated by said discrimination means;

area division means for executing division of said image information into areas; and informing means for informing as to the area where the copyright information is present within said image information, based on the area information determined by said area division and a result of discrimination by said discrimination means;

wherein said informing is the display of the area where the copyright information is present, and said control means executes printing except for the area where said copyright information is present, according to an instruction of the operator.

19. An apparatus according to claim 18, wherein said area division is executed using information indicating an object according to said image information.

20. An image processing apparatus comprising:

extraction means for extracting an isolated point in entered image information;

discrimination means for discriminating copyright information according to an extraction by said extraction means;

control means for controlling printing of said image information when the copyright information is discriminated by said discrimination means;

area division means for executing division of the image information into areas; and informing means for informing as to the area where the copyright information is present within said information, based on the area information determined by said area division and a result of discrimination by said discrimination means;

wherein said area division is executed based on binary digitization.

21. An apparatus according to claim 20, wherein said area division is executed using information indicating an object according to said image information.

22. An image processing apparatus comprising:

extraction means for extracting an isolated point in entered image information;

discrimination means for discriminating copyright information according to an extraction by said extraction means;

control means for controlling printing of said image information when the copyright information is discriminated by said discrimination means;

area division means for executing division of the image information into areas; and informing means for informing as to the area where the copyright information is present within said image information, based on the area information determined by said area division and a result of discrimination by said discrimination means, wherein the image information is represented by a page description language.

23. An image processing method comprising:

an extraction step of extracting an isolated point in the entered image information;

a discrimination step of discriminating copyright information according to an extraction by said extraction step;

a control step of controlling the printing of said image information when the copyright information is discriminated by said discrimination step;

an area division step of executing division of the image information into areas; and an informing step of informing as to the area where the copyright information is present within said image information, based on the area information determined by said area division and a result of discrimination by said discrimination step;

wherein said informing is the display of an area where the copyright information is present, and said control step executes printing except of the area where said copyright information is present, according to an instruction of the operator.

24. An image processing method according to claim 23, wherein said area division is executed using information indicating an object according to said image information.

25. An image processing method comprising:

an extraction step of extracting an isolated point in the entered image information;

a discrimination step of discriminating copyright information according to an extraction by said extraction step;

a control step of controlling the printing of said image information when the copyright information is discriminated by said discrimination step; and a communication step of communicating with a predetermined server through a communication medium;

wherein said control step executes the printing when the printing is permitted by said communication, even if the copyright information is discriminated by said discrimination step.

26. An image processing method comprising:

an extraction step of extracting an isolated point in the entered image information;

a discrimination step of discriminating copyright information according to an extraction by said extraction step;

a control step of controlling the printing of said image information when the copyright information is discriminated by said discrimination step;

an area division step of executing division of the image information into areas; and an informing step of informing as to the area where the copyright information is present within said image information, based on the area information determined by said area division and a result of discrimination by said discrimination step, wherein said area division is executed based on binary digitization.

27. An image processing method according to claim 26, wherein said area division is executed using information indicating an object according to said image information.

28. An image processing method comprising:

an extraction step of extracting an isolated point in the entered image information;

a discrimination step of discriminating copyright information according to an extraction by said extraction step;

a control step of controlling the printing of said image information when the copyright information is discriminated by said discrimination step;

an area division step of executing division of the image information into areas; and an informing step of informing as to the area where the copyright information is present within said image information, based on the area information determined by said area division and a result of discrimination by said discrimination step, wherein said image information is represented by a page description language.

* * * * *

UNITED STATES PATENT AND TRADEMARK OFFICE
CERTIFICATE OF CORRECTION

PATENT NO. : 6,734,992 B1
DATED : May 11, 2004
INVENTOR(S) : Into

It is certified that error appears in the above-identified patent and that said Letters Patent is hereby corrected as shown below:

Title page,
Item [56], References Cited, FOREIGN PATENT DOCUMENTS,
"JP    404169257    6/1992" should read -- JP    4-169257    6/1992 --;
"JP    7074943    3/1995" should read -- JP    7-74943    3/1995 --;
"JP    407210421    8/1995" should read -- JP    7-210421    8/1995 --; and
"JP    411196259    7/1999" should read -- JP    11-196259    7/1999 --.

Column 1,
Line 28, "Firstly" should read -- Firstly, --.

Column 3,
Line 6, "following" should read -- following, --;
Lines 51 and 53, "Also" should read -- Also, --; and
Line 61, "following" should read -- following, --.

Column 4,
Line 30, "following" should read -- following, --; and
Line 43, "similarly" should read -- similarly, --.

Column 5,
Lines 23 and 32, "similarly" should read -- similarly, --;
Line 39, "connected" should read -- connected to --;
Line 44, "also" should read -- Also, --; and
Line 46, "following" should read -- following, --.

Column 6,
Lines 10 and 30, "following" should read -- following, --;
Line 24, "Also" should read -- Also, --; and
Line 66, "given" should read -- give --.

Column 8,
Line 18, "Therefore" should read -- Therefore, --; and
Line 57, "receiving" should read -- received --.

Column 11,
Line 18, "Subsequently" should read -- Subsequently, --; and
Line 46, "gives" should read -- give --.

UNITED STATES PATENT AND TRADEMARK OFFICE
CERTIFICATE OF CORRECTION

PATENT NO. : 6,734,992 B1
DATED : May 11, 2004
INVENTOR(S) : Into

It is certified that error appears in the above-identified patent and that said Letters Patent is hereby corrected as shown below:

Column 12,
Line 27, "prevent" should read -- present --.

Column 13,
Lines 13, 23, 35, 47 and 60, "Also" should read -- Also, --.

Column 14,
Lines 10, 19, 29 and 38, "Also" should read -- Also, --;
Line 18, "ca" should read -- can --; and
Line 54, "Consequently" should read -- Consequently, --.

Signed and Sealed this

Fourth Day of October, 2005

JON W. DUDAS
*Director of the United States Patent and Trademark Office*